B. H. BECKER & J. CIESLA.
SOAP PRESS.
APPLICATION FILED MAR. 6, 1916.

1,231,693.

Patented July 3, 1917.
5 SHEETS—SHEET 3.

Witnesses

Inventor
Benjamin H. Becker & John Ciesla
By Offield Towle Graves & Offield
Attys

UNITED STATES PATENT OFFICE.

BENJAMIN H. BECKER AND JOHN CIESLA, OF CHICAGO, ILLINOIS, ASSIGNORS TO JAMES S. KIRK & COMPANY, OF CHICAGO, ILLINOIS, A CORPORATION OF ILLINOIS.

SOAP-PRESS.

1,231,693.          Specification of Letters Patent.          Patented July 3, 1917.

Application filed March 6, 1916. Serial No. 82,343.

*To all whom it may concern:*

Be it known that we, BENJAMIN H. BECKER and JOHN CIESLA, both citizens of the United States, residing at Chicago, in the county of Cook and State of Illinois, have invented certain new and useful Improvements in Soap-Presses, of which the following is a specification.

Our invention relates to improvements in a type of press which is used in the manufacture of soap in cake form in order to impress upon the blank its final shape and appropriate markings. The machine of our present invention in its main features is of the general type described in our previous United States Letters Patent No. 1,085,236, granted to us January 27, 1914, and No. 1,110,610, granted to us September 15, 1914.

Among the salient objects of the present invention are, to provide a machine of the class described which is adapted for all classes of soaps and sizes and shapes of cakes, including delicate toilet soaps which must be of ornamental finish and unblemished appearance; to provide a machine of the class described in which the movement of each cake of soap is effected positively by grasping the same firmly and moving it bodily in the required direction for the distance necessary to feed the blank or eject the finished cake; to provide a press of the class described which is practically noiseless and capable of operating at high speed with a minimum of vibration; to provide a machine of the class described which may be constructed of a comparatively small number of parts and those of simple and rugged design; to provide a machine which can be operated economically over a long period of time with a minimum expenditure for maintenance and operation; to provide a machine extremely low in initial cost and capable of rapid duplication, and, in general, to provide an improved soap press of the character referred to.

In the drawings which illustrate a preferred embodiment of our invention—

The mechanism of the press is supported on a principal main frame casting 20 (see Figs. 1 and 2) having a pair of side leg frames 21 and 22 and an upper overhanging extension 23. The power shaft 24 is supported at its outer end by a bracket 25, its inner end having bearing in a journal box 26 bolted to the leg frame 21. From a convenient source of power a belt drives the pulley 27 which is capable of being clutched to the shaft 24 by means of a clutch mechanism 28 controlled by the hand-lever 29. Keyed to said shaft 24 is a spur pinion 30 which drives a large spur gear 31 keyed to a shaft 32 suitably journaled at the rear in the frame of the machine. Keyed to said shaft 32 is an eccentric 33 around which is journaled an eccentric strap 34 connected to an adjustable pitman 35. The front end of said pitman is pivotally connected at 36 to the lower end of a large bell crank lever 37, said lever being journaled in the extension 23 upon a transverse pin or shaft 38. The upper end 39 of said bell crank extends in front of the machine in a generally horizontal direction, its ends 40 being suitably shaped to enter an opening 41 in the main plunger or head 42 of the press. It is understood that the plunger or head 42 has its sides suitably planed off as at 43 in order to enter vertical slots as at 44 constructed at the front of the frame extension 23.

Figure 4:
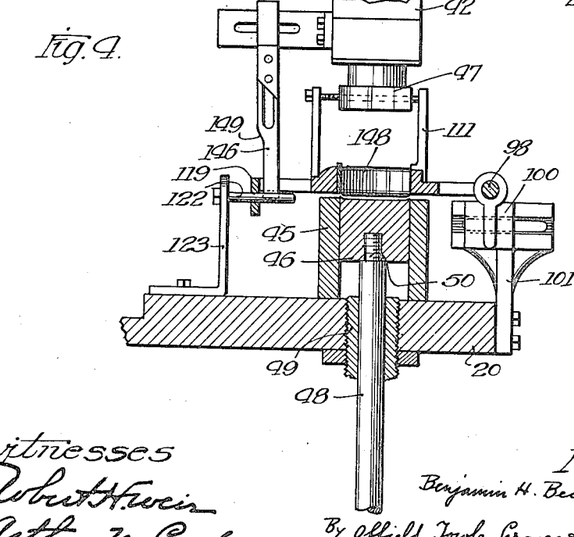
Fig. 4 is a section taken on the line 4—4 of Fig. 1.
Figures 9, 10, 11:
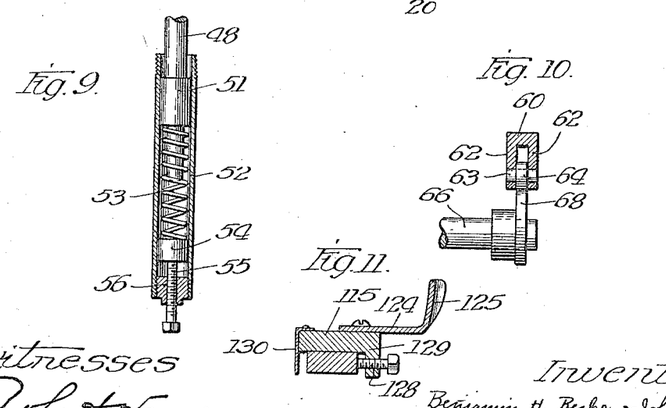
Fig. 9 is a section taken on the line 9—9 of Fig. 1.
Fig. 10 is a section taken on the line 10—10 of Fig. 1.
Fig. 11 is a section taken on the line 11—11 of Fig. 5.

The soap mold comprises a surrounding matrix 45 (see Fig. 4), a spring-supported lower die member 46 reciprocable in said matrix 45, and an upper die member 47 carried by and securely fixed to the lower end of the head 42. The lower die member 46 is carried by a stem 48 sliding in an adjustable bushing 49 and having its upper end 50 threaded into the lower portion of said die member 46. The lower end of the die stem 48 is enlarged slightly, as shown at 51 in Fig. 9, in order to slide within a tube 52 containing a supporting spring 53 supported upon an adjustable plug 54. Said plug 54 may be moved up or down in the tube 52 by means of a screw 55 threaded into a bushing 56 fixed in the lower end of said tube 52. The upper end of said tube 52 (see Fig. 1) is threaded into a flange 57 bolted to the cross member 58 extending between and supported by the legs 21 and 22.

Figure 3:
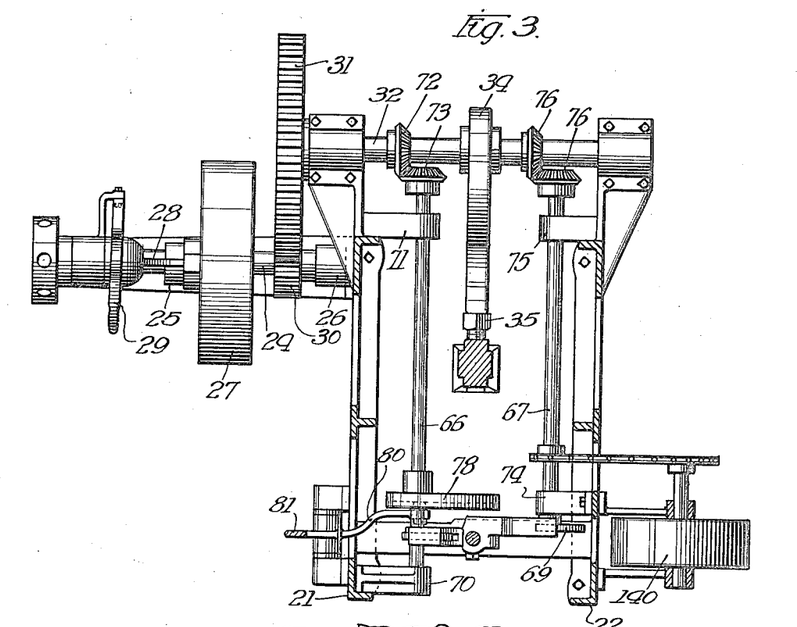
Fig. 3 is a section taken on the line 3—3 of Fig. 1.

A short distance above the cross-rail 58 we secure to the stem 48 (see Fig. 1) a boss 59, diametrically opposite sides of which are extended upwardly and outwardly to form a pair of opposed bifurcated wing members 60 and 61. In the bifurcations 62 (see Fig. 10) of said wing member 60 we support a cam roll pin 63 upon which revolves a cam roll 64. The wing member 61 is equipped with a cam roll 65 in substantially the same manner. Immediately below the centers of the two cam rolls 64 and 65 are a pair of fixed shafts 66 and 67 carrying a pair of cams 68 and 69 which engage said cam rolls 64 and 65. The shaft 66 is supported in the frame of the machine as by brackets 70 and 71 (see Fig. 3) and is driven at its rear end from the shaft 32 by means of a pair of bevel gears 72 and 73. The shaft 67 is similarly journaled in a pair of brackets 74 and 75 and driven from the same shaft 32 by similar bevel wheels 76 and 77.

Figure 1:
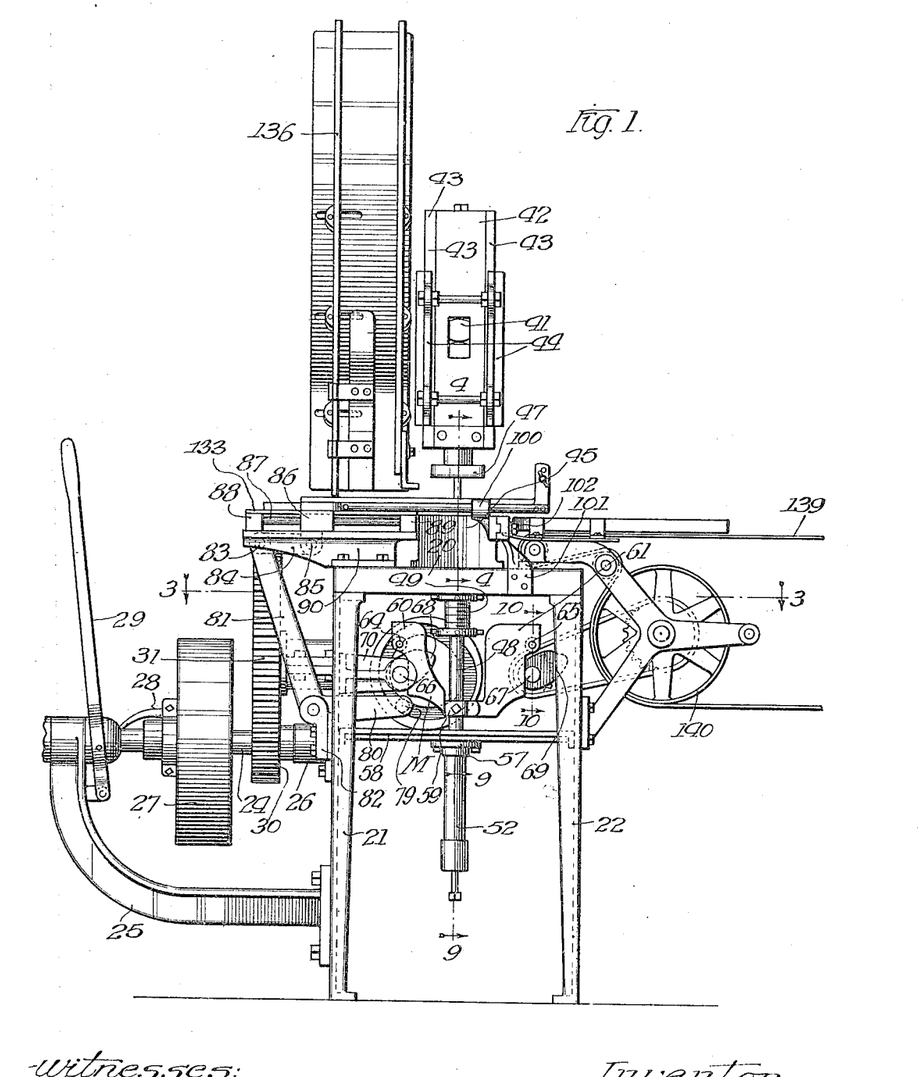
Figure 1 is an end elevation of a press selected by us as illustrating the application of our invention.

Referring to the mechanism for feeding the soap blanks and delivering the completed cakes, on the shaft 66 there is keyed a large circular cam 78, the side of which is grooved out, as shown in Fig. 1, to accommodate a cam roll 79 rotatably supported on the end of the short horizontal arm 80 of a bell crank lever 81. Said bell crank lever 81 is pivoted in a bracket 82 bolted to the leg frame 21, its upper end being pivotally connected at 83 to a link 84 (see also Fig. 6) which is pivotally connected at 85 to a cross head 86. The cross head 86 is arranged to slide transversely of the machine upon a pair of guide-rods 87 securely supported in blocks 88 and 89 carried by a pair of castings 90 and 91 bolted to the top of the frame 20 (see also Fig. 7). Front and rear side extensions 92 and 93 of said cross head side rest and slide upon the top faces of said brackets 90 and 91. The front side 92 of said cross head carries an elongated side piece 94 which extends across the press in front of the matrix and is capable of adjustment toward or from said matrix by means of a pair of set screws 95 threaded into the extension 92 and passing through a slot 96 in the enlarged end 97 of said side piece 94. Also secured in said enlargement 97 is the left-hand end of a substantial slide rod 98, the other end of which is secured to a lug 99 projecting from the end of said side piece 94. The slide rod 98 is supported in a small bearing guide 100 (see Figs. 1, 4 and 5) which is mounted to slide transversely across the face of a bracket 101 bolted to the front of the frame 20. The guide 100 is clamped in any desired position by means of a set screw 102 (see Fig. 1).

Figure 7:
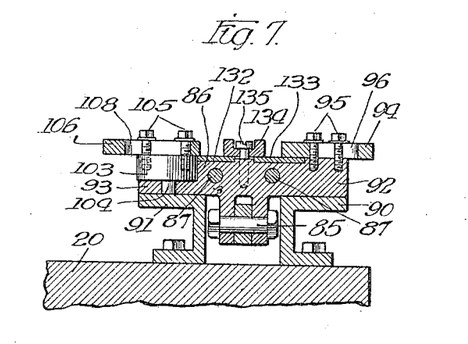
Fig. 7 is a section taken on the line 7—7 of Fig. 5.
Figure 8:
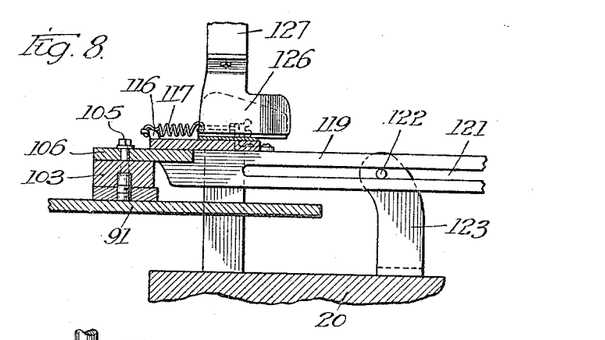
Fig. 8 is a section taken on the line 8—8 of Fig. 5.

Referring to Fig. 7, the rear extension 93 of the cross head 86 is cut away to form a pivotal support for a thick disk-shaped piece of steel 103 which rotates upon a pin 104 fixed in said extension 93. To the top surface of the disk 103 we clamp, as by screws 105, the enlarged end 106 of a long gripper arm 107 (see Fig. 5). The enlargement 106 is slotted, as shown at 108, in order to permit adjustment of the long arm 107 toward the side piece 94. Said arm 107 extends substantially parallel with the side piece 94 and behind the matrix and is normally pulled toward the side piece 94 by means of a spring 109 adjusted by an eye-bolt 110. The spring is connected across a pair of upstanding lugs 111 and 112 on the ends of the side piece 94 and long arm 107, and the movement of said arm 107 toward the side piece 94 is limited by a distance rod 113, one end of which is adjustably secured in the lug 112. Mounted on the enlargement 106 and just to the right of the slot 108 (see Fig. 5) we pivotally mount at 114 a short gripping arm 115 which swings in a horizontal plane as does the long arm 107. On the left hand end of the short arm 115 is secured an arm 116, the end of which is operated upon by a coil spring 117 adjustably secured to a small angle piece 118 mounted on the top of the bar 119. The bar 119 is rectangular in section, one end being secured in the enlargement 106 and the other end being connected to a lug 120 on the right hand end of the arm 107. The bar 119 is slotted, as shown at 121, in order to accommodate a horizontal guide-pin 122 fixed in the upper end of the bracket 123 mounted on the frame 20. Secured to the top face of the short gripping arm 115 is a piece of sheet metal 124 formed with an upturned cam wing 125. Said cam wing 125 is suitably shaped to coöperate with an adjustable cam member 126 (see Figs. 5 and 2) projecting downwardly from the bracket member 127 secured to the top of the frame 20. It will be observed that in the position shown in Fig. 5 the cam member 126 forms a stop coöperating with the cam wing 125 to prevent movement of the arm 115 under the influence of the spring 117. When the cross head is moved in such position that the cam wing 125 is out of engagement with the fixed cam piece 126, the spring 117 swings the arm 115 on its pivot 114. Said movement is limited by a stop-screw 128 threaded in a lug 129 projecting downwardly from the lower side of the arm 115 (see Fig. 11).

The inner faces of the arms 115 and 107 are shod with plate 130 and felt 131 in order to prevent injury to the soap and to effect a better grasping of the same. The upper surface of the cross head 86 is furnished with a pair of sheet metal slide plates 132 and 133 (see Figs. 5 and 7). Supported upon said plates 132 and 133 is a grooved wooden strip 134 slidably mounted longitudinally of the cross head and adjusted by means of screws 135. The right-hand end of said strip 134 is squared off in order to constitute a pushing face for thrusting the soap cakes from beneath the pile in the soap chute.

Figure 2:
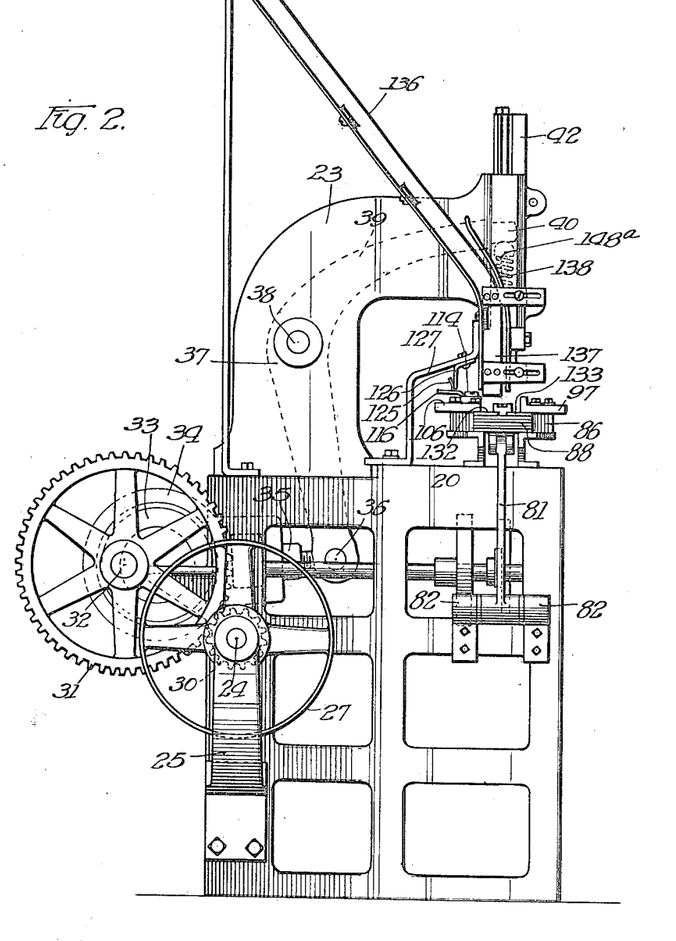
Fig. 2 is a side elevation of the press shown in Fig. 1.
Figure 5:
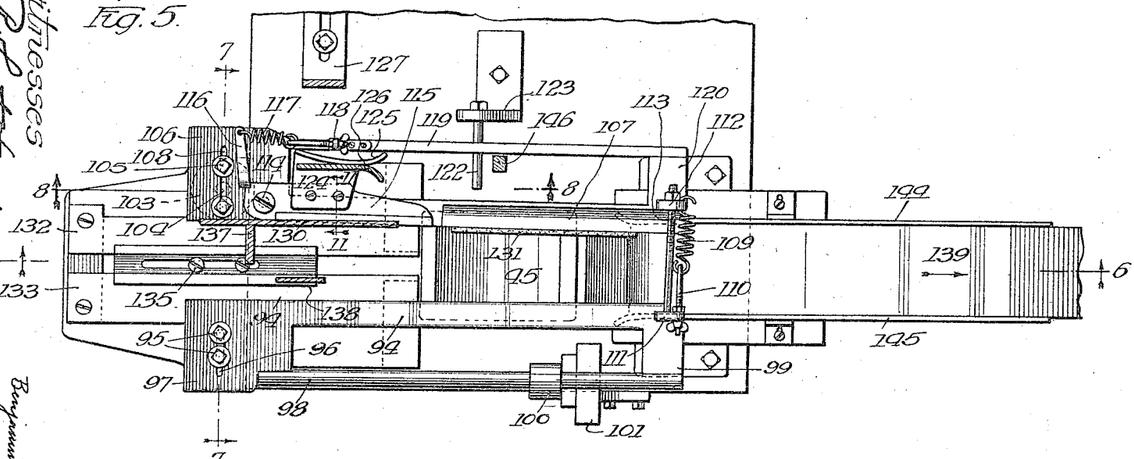
Fig. 5 is a section taken on the line 5—5 of Fig. 1.
Figure 6:
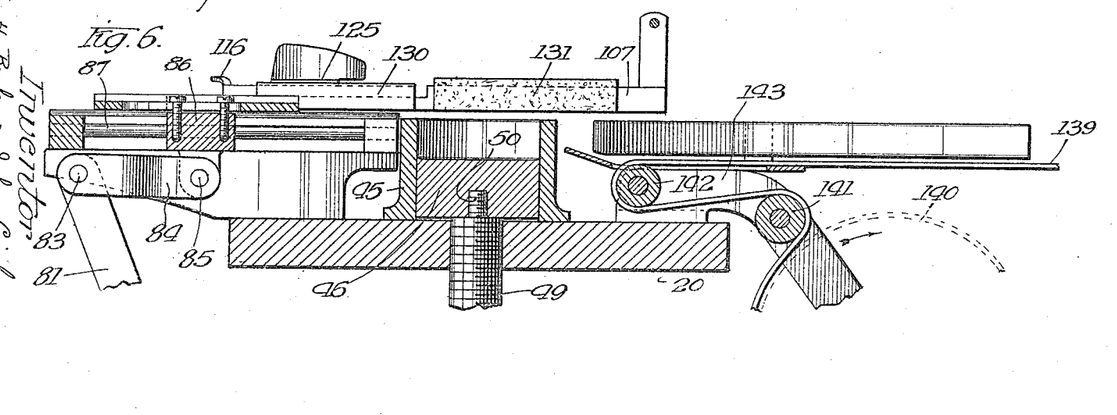
Fig. 6 is a section taken on the line 6—6 of Fig. 5.

The blanks of soap which have been previously cut to the proper dimensions are fed to the machine by way of an inclined soap chute 136 (see Figs. 1 and 2), the lower end of which is formed vertical, as shown in elevation in Fig. 2, the lower end thereof being shown in section in Fig. 5. The sides 137 and 138 are adjustable so as to accommodate soap cakes of different dimensions.

The completed cakes are conveyed from the machine by means of an endless belt 139 which is trained over a series of pulleys 140, 141 and 142, said pulleys being supported in side brackets 143 supported by the frame 20. Proper alinement of the completed cakes is obtained by the side guides 144 and 145 arranged at the edges of said belt 139.

Describing the operation of the press, it is understood that the soap, previously cut to the required dimensions and in the form of rectangular blocks, is placed in a pile in the soap-holder or chute 136, the lower cake of soap resting upon the cross head 86. Assuming now that the mechanism is in such position that the cross head 86 is in its extreme left-hand location, i. e., fully retracted, the pusher strip 134 will be located with its right-hand pusher face behind, that is to the left of, the lower cake of soap in the soap-holder, and the cam wing 125 will be behind the fixed cam piece 126, thus preventing the short soap gripper arm 115 from swinging into contact with the soap in the holder. At this time, the head 42 being depressed, will have lowered the prong 146 into such position that it will engage the bar 119 and thus the long soap gripper arm 107 is also prevented from contacting with the soap cake being operated upon by the plunger. It is understood that the prong 146 is adjustably mounted both vertically and horizontally with respect to the plunger 42. It should be understood that the shape of the cam groove 59 is such that the movement of the cross head while in its retracted position is delayed, or substantially delayed, for a sufficient time to permit the soap presser head 42 to descend and operate upon the soap cake in the matrix. This latter operation is effected as follows. Upon revolution of the shaft 24 the shaft 32 is rotated through the spur gears 30 and 31 and the eccentric 33 causes horizontal movement of the lower end of the bell crank lever 37 with a resultant up-and-down movement of the presser head 42. In its descent the presser head 42 forces the upper die 47 against the soap blank 148, which has previously been dropped into the matrix because the prong 146 has engaged the bar 119 and has forced out the long gripping arm 107 against the tension of spring 109. The soap blank is thus compressed in the matrix 45 by the upper die member 47 and the lower die member 46, excess movement of the arm 39 being taken care of by the compression spring 148$^a$.

After the plunger head 42 has completed its descent, it rises out of engagement with the soap in the matrix and shortly thereafter the cams 58 and 69 in their revolution engage the cam rolls 64 and 65 and raise the bifurcated wing members 60 and 61, causing the stem and lower die to rise and eject the soap cake upwardly out of the matrix. Immediately after the soap cake has been raised to the required height by movement of said cams 68 and 69, the inclined portion 149 on the prong 146 loses engagement with the bar 119 which permits the gripper arm 107 to engage the cake under the influence of spring 109, grasping it between the inner felt-lined face 131 and the inner face of the side member 94. When this occurs the cross head commences to move toward the center of the press and at its farthest inward position the plunger 42 again descends and causes the prong 146 to engage the bar 119 and release the gripper arm 107 and allow the finished soap cake 148 to drop upon the surface of the constantly running conveyer belt 139. At the commencement of the inward movement of the cross head, the pusher strip 134 engages the bottom blank of the pile of soap blanks in chute 136 and forces the same from beneath the pile. As soon as the rear end of said bottom soap blank becomes disengaged from the pile of soap blanks in the chute the cam wing 125 loses engagement with the fixed cam piece 126 permitting the spring 117 to force the short gripper arm 115 into engagement with the side of the blank, thus grasping the same between its inner face 130 and the inner face of the side bar 94. Hence, during the further movement of the cross head the cake is securely grasped between the side bar 94 and the short gripper arm 115. When the cross head arrives at its inmost position said blank of soap will be directly over the matrix ready to be dropped therein as soon as the descent of the plunger head 42 causes the inclined surface 149 of the prong 146 to engage the bar 119. After the prong 146 has moved down a sufficient distance to force back the arm 107 and drop the blank into the matrix and the completed cake onto the conveyer belt, the cross head commences its return movement. During said return movement of the cross head, the plunger head 42 descends and compresses the cake which has previously been dropped into the matrix. The cycle of operation is thereupon repeated.

This construction has many advantages over those in presses which have heretofore been brought to our attention. It will be observed that the soap blank is at all times grasped securely by the gripper arms and is not permitted to leave their control until arriving immediately above the matrix. This insures that it will at all times fall squarely into the matrix without tipping or falling end first. The delivery of the completed cake is effected in substantially the same manner and does not depend upon a pushing movement imparted to it by the next blank. Hence there is no tendency to bruise or injure the cake after it has been finished by the action of the soap dies. The construction of the mechanism for elevating the lower die stem is peculiarly efficient for the reason that there is no tendency to cramp the stem in either its upward or its downward movement.

The construction described is manifestly capable of modification without sacrificing the benefits or advantages of the invention, hence the scope of the invention must be determined by reference to the appended claims.

We claim—

1. In a soap press, the combination of a vertically reciprocable upper die head, a lower die, means for lowering said upper die to compress a soap blank between the two dies, means for automatically raising the lower die after recession of the upper die head, a gripper movable to convey the soap from the die, and means for automatically causing said gripper to grasp a formed cake supported on the raised lower die, said means being controlled by the reciprocatory movement of said die head.

2. In a press of the class described, the combination of a reciprocatory presser head, a die carried thereby, a spring-supported complementary die alined with said upper die, a cross head operating at right-angles to said dies, movable gripping means connected to said cross head, a spring tending to operate said gripping means, and a member carried by one of said die members for automatically releasing the gripping means upon approachment of said die members.

3. In apparatus for feeding articles such as blanks of soap, the combination of a substantially vertical chute for receiving the articles in superimposed relation, said chute having an opening at one of its lower sides to permit an article to be pushed laterally therefrom, a generally flat reciprocatory member for closing the lower end of said chute, a raised projection on the upper side of said flat member for urging a soap blank from out of the end of said chute, mechanism for operating upon said soap blank, means for reciprocating said flat member across the end of said chute, and gripping means on said reciprocatory member for conveying said soap blank bodily into the field of said operating mechanism.

4. In apparatus for feeding articles such as blanks of soap, the combination of a substantially vertical chute for receiving the articles in superimposed relation, said chute having an opening at one of its lower sides to permit an article to be pushed laterally therefrom, a generally flat reciprocatory member for closing the lower end of said chute, a raised projection on the upper side of said flat member for urging a soap blank from out of the end of said chute, die mechanism for operating upon said soap blank, means for reciprocating said flat member across the end of said chute, gripping means carried by said reciprocatory member for conveying said soap blank bodily into the field of said die mechanism, and means for releasing said gripping means controlled by the operation of said die mechanism.

5. In a press of the class described, the combination of a chute for maintaining a series of soap blanks in superimposed relation, said chute having an opening in its side at its lower end, a cross head reciprocable across the end of said chute, die members operating transversely of said cross head, and a pair of gripper members pivotally mounted upon said cross head, one of said gripper members being adapted to convey the soap blank into the field of said die mechanism and the other gripper member being adapted to remove the finished cake.

6. In a press of the class described, the combination of a chute for maintaining a series of soap blanks in superimposed relation, said chute having an opening in its side at its lower end, a cross head reciprocable across the end of said chute, die mechanism operating transversely of said cross head, a pair of gripper members pivotally mounted upon said cross head, one of said gripper members being adapted to convey the soap blank into the field of said die mechanism and the other gripper member being adapted to remove the finished cake, the movement of said cross head being synchronized with the movement of the die mechanism, and means for releasing the gripping members when retracted by said cross head.

7. In a press of the class described, the combination of a soap chute for delivering a series of soap blanks, a cross head working across the end of said chute, a matrix, reciprocatory die mechanism coöperating with said matrix to compress a soap blank deposited therein, a projection on said cross head for initially freeing a soap blank from said chute, and a gripper member normally inoperative during said initial freeing movement but operative thereafter to advance said blank into the field of said die mechanism.

8. In a press of the class described, the combination of a soap chute for delivering a series of soap blanks, a cross head working across the end of said chute, a matrix, reciprocatory die mechanism coöperating with said matrix to compress a soap blank deposited therein, a projection on said cross head for initially freeing a soap blank from said chute, a gripper member normally inoperative during said initial freeing movement but operable thereafter to advance said blank into the field of said die mechanism, and a separate gripper member also carried by said cross head for advancing the completed blank during substantially the entire forward movement of said cross head.

9. In a press of the class described, the combination of a soap chute for delivering a series of soap blanks, a cross head working across the end of said chute, a matrix, reciprocatory die mechanism coöperating with said matrix to compress a soap blank deposited therein, a projection on said cross head for initially freeing a soap blank from said chute, a gripper member normally inoperative during said initial freeing movement but operable thereafter to advance said blank into the field of said die mechanism, and means controlled by the movement of said die mechanism for automatically releasing said gripper member during the backward movement of said cross head.

10. In a press of the class described, the combination of a substantially vertical soap chute for supporting a series of soap blanks, a cross head working across the end of said chute, a matrix, reciprocatory die mechanism coöperating with said matrix to compress a soap blank, a raised surface on said cross head provided with a shoulder for engaging and thrusting the bottom soap blank from the end of said chute, means for reciprocating said cross head in the direction of said matrix, a gripper member movably mounted on said cross head, automatic means tending to cause said gripper member to grasp the soap during the forward movement of the cross head toward the matrix, cam mechanism for releasing said gripper member when the soap is positioned over said matrix, and means for rendering said gripper member inoperative during that portion of the movement of the cross head occupied in freeing the soap blank from the pile.

11. In a soap press, the combination of a matrix, a soap chute for supporting a series of substantially rectangular soap blanks having an opening in its side toward the matrix for laterally delivering a single blank, a cross head operating transversely across the end of said chute in the direction of said matrix, reciprocatory die mechanism coöperating with said matrix to compress a soap blank and operating in a direction substantially at right angles to the direction of movement of said cross head, a level raised portion on said cross head for supporting the pile of blanks having a shoulder for ejecting the bottom blank, a gripper member movably mounted on said cross head for engaging the delivered soap blank, and release mechanism for depositing the soap blank in the matrix.

12. In a soap press, the combination of a matrix, a soap chute for supporting a series of substantially rectangular soap blanks having an opening in its side toward the matrix for laterally delivering a single blank, a cross head operating transversely across the end of said chute in the direction of said matrix, reciprocatory die mechanism coöperating with said matrix to compress a soap blank and operating in a direction substantially at right-angles to the direction of movement of said cross head, a level raised portion on said cross head for supporting the pile of blanks having a shoulder for ejecting the bottom blank, a gripper member movably mounted on said cross head for engaging the delivered soap blank, mechanism controlled by the movement of said die mechanism to release the blank when in register with said matrix, and a second gripper member also movably mounted on said cross head for automatically picking up and delivering the completed cake.

13. In a soap press, the combination of a matrix, a soap chute for supporting a series of substantially rectangular soap blanks having an opening in its side toward the matrix for laterally delivering a single blank, a cross head operating transversely across the end of said chute in the direction of said matrix, reciprocatory die mechanism coöperating with said matrix to compress a soap blank and operating in a direction substantially at right angles to the direction of movement of said cross head, a level raised portion on said cross head for supporting the pile of blanks having a shoulder for ejecting the bottom blank, a gripper member movably mounted on said cross head for engaging the delivered soap blank, mechanism controlled by the movement of said die mechanism to release the blank when in register with said matrix, mechanism for ejecting the completed cake from the matrix, and a second gripper member also movably mounted on said cross head for automatically picking up and delivering the completed cake.

14. In a soap press, a reciprocatory plunger head, a die carried by said reciprocatory plunger head for operating upon a cake of soap, gripping means for holding the soap, said gripping means movable in a direction transversely to the direction of the movement of the reciprocating presser head, and releasing means synchronized with the reciprocating presser head for releasing the soap from the gripper upon descent of the presser head.

BENJAMIN H. BECKER.
JOHN CIESLA.

Copies of this patent may be obtained for five cents each, by addressing the "Commissioner of Patents, Washington, D. C."